Jan. 19, 1965  R. F. REIFERS ETAL  3,166,467
METHOD FOR PRODUCING MOLDED PULP ARTICLES
Original Filed Oct. 5, 1959  8 Sheets-Sheet 1
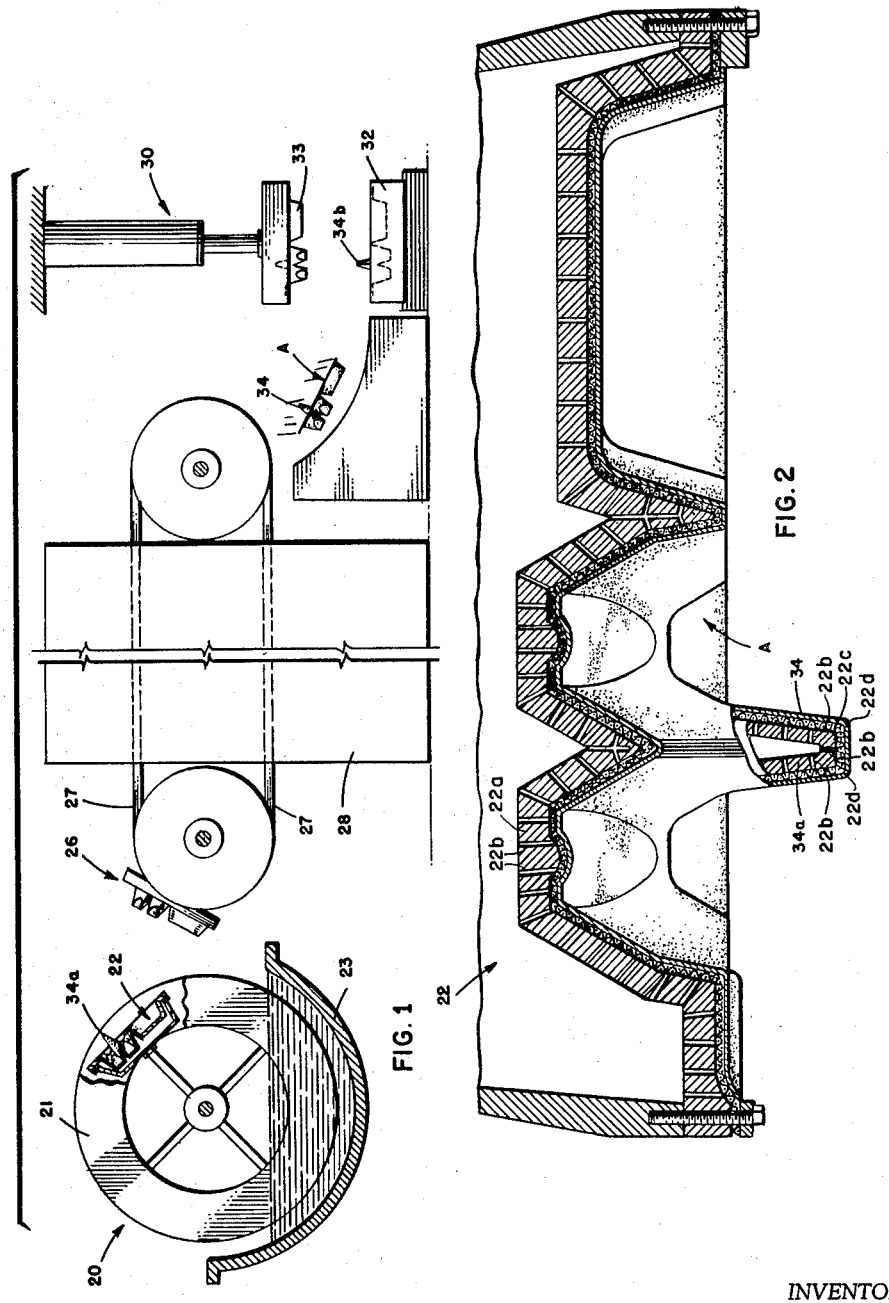
INVENTORS
Richard F. Reifers &
Henry A. Lord
BY  Karl W. Flocks
ATTORNEY Jan. 19, 1965  R. F. REIFERS ETAL  3,166,467
METHOD FOR PRODUCING MOLDED PULP ARTICLES
Original Filed Oct. 5, 1959  8 Sheets-Sheet 2

INVENTORS
Richard F. Reifers &
Henry A. Lord

BY  *Karl W. Flocks*

ATTORNEY

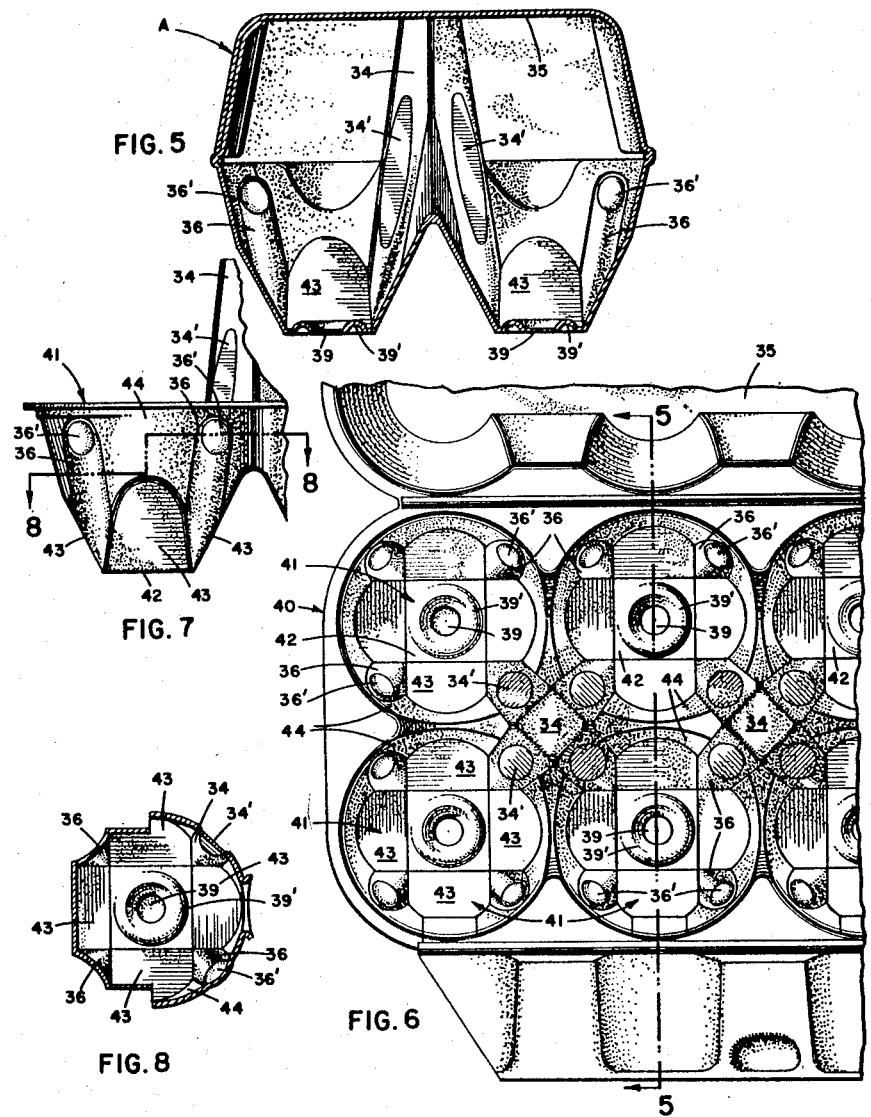

Jan. 19, 1965    R. F. REIFERS ETAL    3,166,467
METHOD FOR PRODUCING MOLDED PULP ARTICLES
Original Filed Oct. 5, 1959    8 Sheets-Sheet 4

INVENTORS
Richard F. Reifers &
Henry A. Lord

BY    *Karl W. Flocks*

ATTORNEY

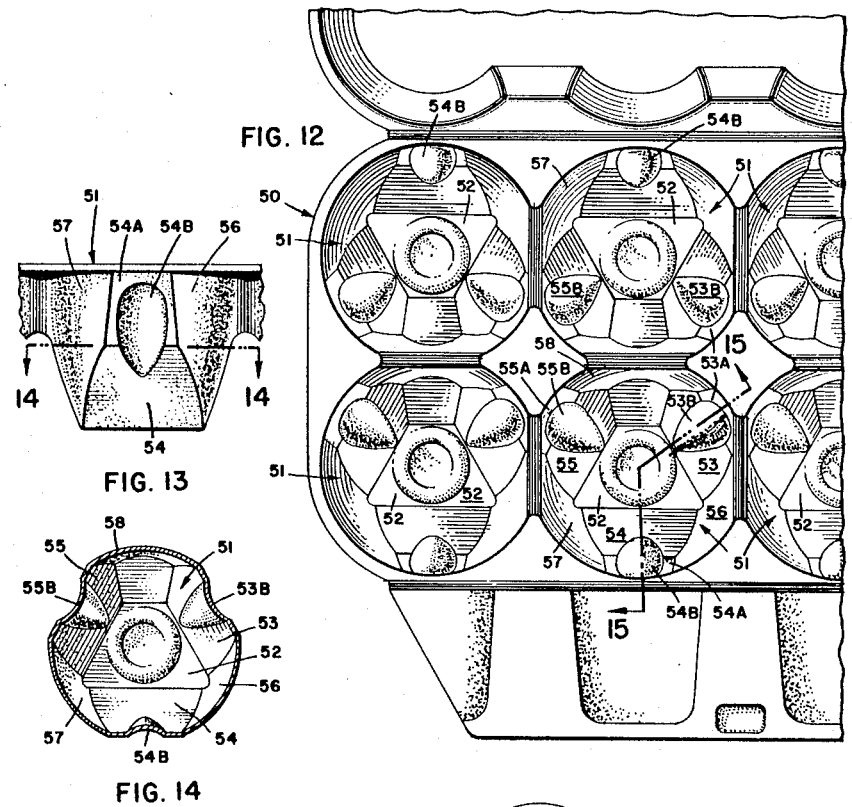

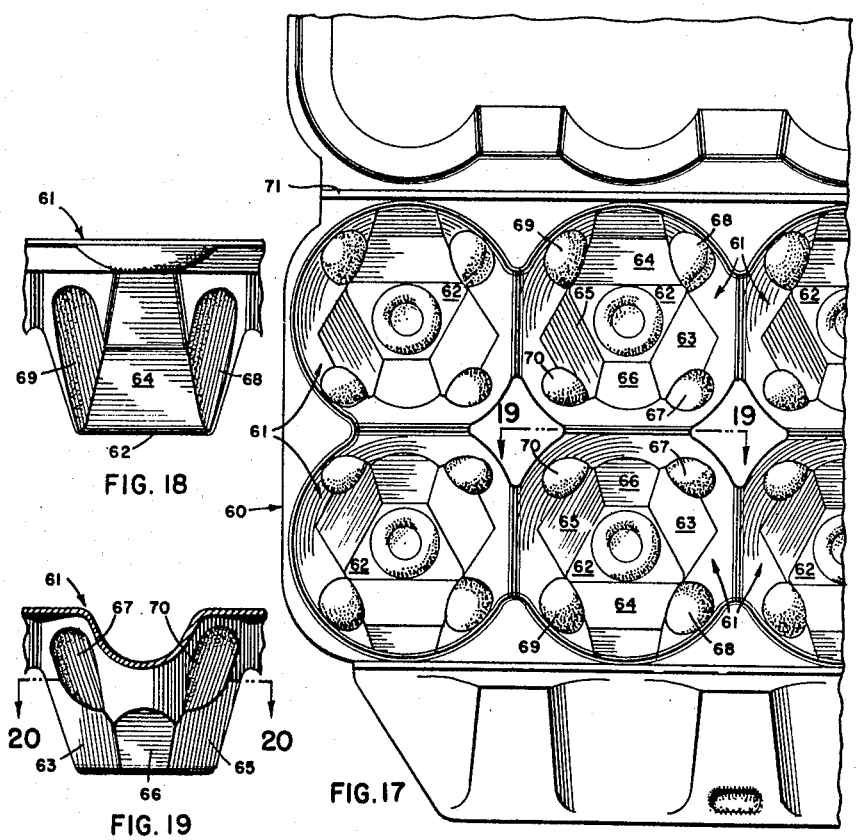
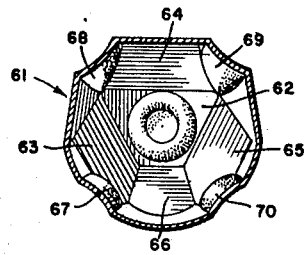
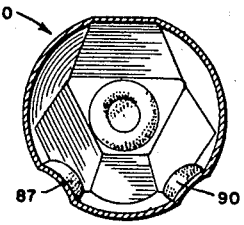
FIG. 18
FIG. 19
FIG. 17
FIG. 20
FIG. 21
INVENTORS
Richard F. Reifers &
Henry A. Lord
BY Karl W. Flocks
ATTORNEY Jan. 19, 1965   R. F. REIFERS ETAL   3,166,467
METHOD FOR PRODUCING MOLDED PULP ARTICLES
Original Filed Oct. 5, 1959   8 Sheets-Sheet 7

INVENTORS
Richard F. Reifers &
Henry A. Lord

BY   Karl W. Flocks

ATTORNEY

Jan. 19, 1965    R. F. REIFERS ETAL    3,166,467
METHOD FOR PRODUCING MOLDED PULP ARTICLES
Original Filed Oct. 5, 1959    8 Sheets-Sheet 8
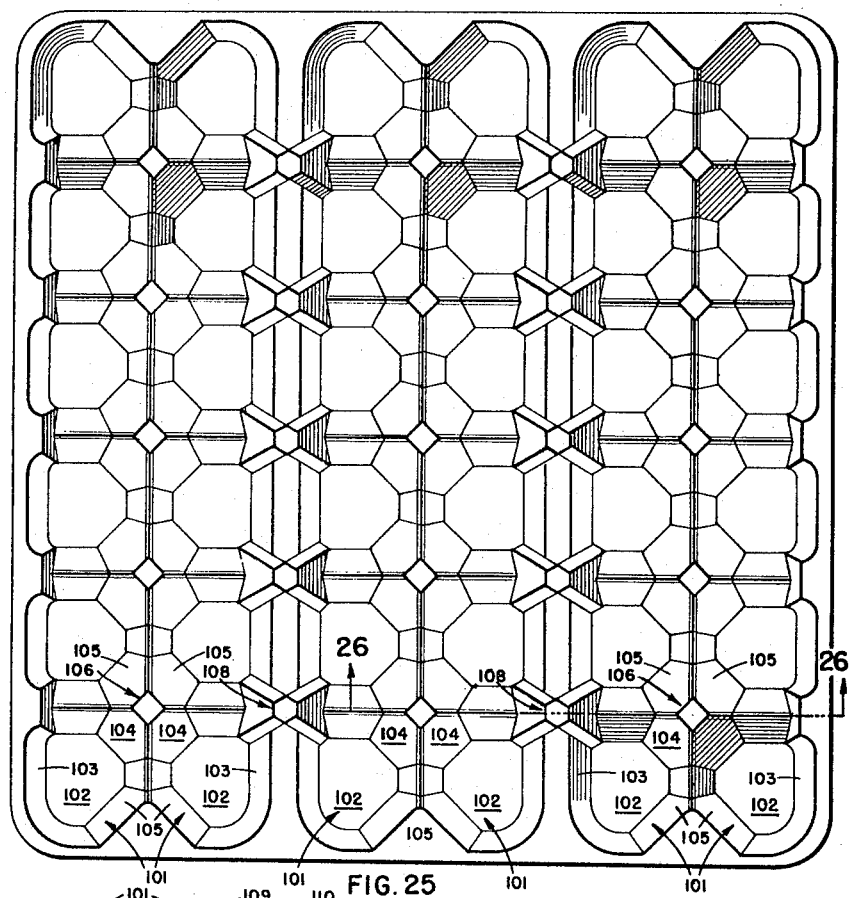
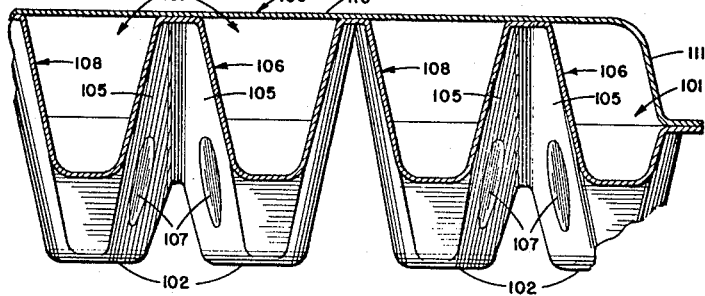
FIG. 26
INVENTORS
Richard F. Reifers &
Henry A. Lord
BY    *Karl W. Flocks*
ATTORNEY

3,166,467
METHOD FOR PRODUCING MOLDED PULP ARTICLES

Richard F. Reifers, New Canaan, Conn., and Henry A. Lord, Palmer, Mass., assignors to Diamond National Corporation, New York, N.Y., a corporation of Delaware
Continuation of application Ser. No. 844,438, Oct. 5, 1959. This application Oct. 18, 1962, Ser. No. 231,435
5 Claims. (Cl. 162—223)

The present invention relates to an egg carton or similar article made of molded pulp and a process and apparatus for making the same.

This application is a continuation of applicants' co-pending application Serial No. 844,438, filed October 5, 1959, now abandoned.

In the art of making articles of molded pulp, there are three well-known processes.

In the first process, the article is formed by being molded onto a mold that has suction applied to one side thereof and is immersed in a slurry that is made up of wood and/or paper fibers and water, the fibers being sucked up by the suction applied to the mold and held by a screen thereon that is in the shape of the article to be made; the water passes through the screen and is exhausted. From the mold, the article is transferred in the first process to a support that is generally planar and passes through a heating means, such as an oven. This is known as free drying. Where a higher quality product is desired, the free-dried article may be hot pressed between mating pressing dies, and this may or may not be accompanied by a spraying of the article.

In a second well-known process, the article is molded or formed as above stated, but is transferred after being molded onto a form and it is on this form that it passes through the oven or other heating means; the form may or may not be heated itself either in addition to or as a substitute for the oven type heating means. After the drying step, the article is transferred to mating pressing dies as above described. This process is known as the form drying process.

In the third process, two articles are formed on separate molds and these articles are then brought together and laminated, so that the resultant article is laminated from the two molded articles. In this process, in which form drying is preferably used, the composite or laminated article is pressed between male and female heated dies.

It is understood in the art that free drying gives the most warpage, that form drying considerably reduces the warpage and that hot pressing substantially eliminates all warpage and restores the article to the form and shape that it had when originally molded.

In all of these processes, and in variations of them known to the art, the after-pressing, which is the pressing that takes place after the molding or forming of the article, is for the purpose of restoring the article's shape to that it originally had and hence was recognized as a correcting or rectifying step in which little or no change was made in the actual configuration of the article, such changes as were made being largely for producing only surface effects on the articles.

In addition to these three generally recognized processes, there is also known a process in which the initial molding operation is of a sheet that is thereafter formed into the desired configuration by pressing the article to the desired form. This is similar to the well-known press forming of sheet metal, and is limited as to depth of draw of the article and to simple geometric shapes.

One of the primary uses of the articles produced from molded pulp is for the packaging of fragile articles, egg cartons being one leading example. There are certain characteristics that are desired for the egg cartons that are produced, and some of these characteristics, at least, depend upon the process by which the article was made.

For example, in cartons for packaging eggs, it is desirable to have a carton that is strong and will withstand a considerable amount of force. This is necessary in order that the carton may be handled in automatic machinery and may protect the eggs, or other fragile articles, from shock and other forces that arise during the handling of the filled carton both in automatic closing and sealing machinery and in the transporting of the filled carton from place to place during the marketing operations. In addition to the strength characteristics, the carton must not be hard and unyielding for if it were the eggs would be subjected to impact shocks that would tend to cause egg breakage. Consequently, it is desirable that those parts of the carton that are in contact with the egg or other fragile object possess a certain amount of softness and/or resiliency so that the shocks will be cushioned and their effect mitigated to thus reduce or avoid egg breakage. In particular, it has been found that articles that are after-pressed, that is, that are pressed after the molding and drying operations, have imparted to them a reduced hardness and a smooth surface. This is due to the fact that the fibers are disturbed from their original bond by the pressing along with the reduction of original thickness.

Because after-pressing was known to reduce hardness of the carton, many workers in the art have previously sought to provide a configuration of carton that would take advantage of this result. For example, there are known in the prior art egg cartons in which the egg cells have convex ribs that extend into the concave cells and are engaged by an egg placed therein. It has even been stated in the prior art that these ribs or flutes will deflect, as when a large egg is placed in the cell; however, this deflection is of a rib or flute that is molded into the carton and thus partakes of the known strength of the carton material plus added rigidity because of its shape. Consequently, experience has shown that these flutes or ribs do not readily deflect and consequently there is less deflection and cushioning than was intended and desired.

By the process of the present invention, the configuration of the molded article is changed in the after-pressing operation. This change, which may conveniently be designated as a "reforming" of the article, is accomplished by having after-pressing dies of different configuration or shape, in certain parts, than any of the other molds, dies or instrumentalities that were used to initially form the article. There is thus obtained a carton that may have the same or similar configuration to that of a previously known carton, but which will have the above noted superior cushioning ability as a result of the forming and reforming steps of the present inventive process. In addition, it will be seen that where it is desired to modify, within certain limits, the configuration of an article that is in production, it is only necessary with the present process to make new pressing dies and to install them only in that part of the apparatus that is used for after-pressing, and it is not necessary to make and install new molds and dies, throughout and to halt the apparatus until the new molds and dies can be installed. As a consequence, a four-week conversion time is reducible to less than a half of a day, with attendant saving of production time and overhead and other expense.

The machinery of suction molds or dies is very expensive and time consuming. A plurality of such dies are mounted in sealed, longitudinally and circumferentially spaced relation on a huge cylinder. The cylinder is rotated in a slurry of pulp fibers and the dies are periodically subjected to vacuum when immersed in the pulp slurry.

It is not only expensive to "tool" up for a new shape of egg carton, but those skilled in the art appreciate that relatively thin hollow shapes are extremely difficult to form. Sufficient "draft" must be provided to permit removal of a preform. Where a deep hollow shape is relatively narrow, for example, the suction dies do not provide sufficient suction holes to draw the pulp slurry therethrough in order to form the preform without thinned out spots or holes. Thus it is well known that unless sufficient suction can be applied at critical portions or shapes to be formed instead of forming a preform as a uniformly thick layer of pulp fibers, improperly formed areas will result.

One expedient utilized to overcome the formation failures where suction holes are at a minimum is to keep the suction dies immersed in the pulp slurry an exceedingly long time. This of course increases production time and the cost of the finished article.

Cost is one of the primary concerns in pulp articles being produced, especially egg carton, since these containers are generally of the "single use" or "throw-away" type.

If relatively complex or intricate and difficult-to-mold shapes are formed on suction molding apparatus, the problems of plugged-up dies and accompanying maintenance costs increase. It is highly desirable to produce articles with the least number of rejects and yet maintain production at peak efficiency.

By reforming the more intricate and complex shapes away from the suction apparatus, the pressing dies, which are relatively simple to machine and install, reduce plant conversion time to a bare minimum and yet provide for article shapes and selected portions which are extremely difficult to produce on the suction dies.

Modification of the configuration of an egg carton finds one application in the manufacture of egg cartons of a size to hold very small eggs known as the pullet size.

Pullet eggs are laid by new layers, and the season is generally heavier in July and August, although with the recently adopted practice of rotating flocks, seasonal increases in pullet eggs are less pronounced than formerly.

In order to make pullet size molded pulp egg cartons, it would have been necessary to produce complete sets of dies and forms for the entire production machinery. This would take about nine months, and thus require considerable advance planning. The new size dies would be substituted during a four-week changeover period, and then after a short run was made, a second changeover period would be required to change back to the original dies and forms. These changeover periods would have necessitated the machine shut down for excessive periods with resultant loss of profits. As a result of these economic limitations, production of the pullet carton was precluded.

Further, it has been found that for eggs of approximately the same diameter, some are longer, measured from the point of maximum girth, than others, and some of these longer eggs will come into contact with the bottom of the egg cell. Efforts have been made in the past to support the egg by holes or thin wafer-like sections, but the hole has been found to have a hard edge and thus to give rise to high local pressures on the egg, with resultant breakage, and the control of quality limits of the thin sections has proven difficult, so that there has not been provided heretofore an entirely satisfactory construction of egg carton cell bottom.

Modification of the configuration of an egg carton finds another application in the manufacture of egg cartons having a cellular bottom section and a cover section with a planar top and posts to support the planar top of the cover section. While cellular bottom sections with posts between the cells have been provided, and while it has been suggested that one or more of these posts could be high enough to contact with the underside of the top of the cover section, in practice this latter construction has not been adopted because those skilled in the art have considered it impossible to achieve within the space limitations established by the egg packaging industry. It may be mentioned parenthetically that the modification of an existing carton construction by providing essentially a post resulting from an extension of the height of the walls between the cells at their existing angle results in a post with an extremely small or pointed top. This construction is not satisfactory because the post top tends to penetrate the cover top, rather than support it, and furthermore it is not practical to produce because of complex construction. Alternatively, to provide a construction in which the angle of taper was modified to provide the necessary top area would result in a construction which would not nest nor give sufficient egg room.

An object of the present invention is to provide a process for making articles of molded pulp that will enable the configuration of the article to be changed more rapidly and economically than in the past.

Another object of the present invention is the provision of a process that will result in a molded pulp article that will provide greater cushioning for objects held therein.

Yet another object of the present invention is to provide a process that facilitates the effecting of modifications in the configuration of an article that is in production.

A further object of the present invention is to provide a process for manufacturing molded pulp egg cartons having a post supporting the planar top of the cover thereof.

A still further object of the present invention is the provision of an apparatus for forming and reforming articles of molded pulp so as to improve their characteristics.

Another object of the present invention is to provide an apparatus for making molded pulp articles that may may be readily incorporated into plants now equipped with molded pulp article-making apparatus with a minimum of time and expense.

Yet another object of the present invention is the provision of an egg carton having improved egg cushioning characteristics.

A further object of the present invention is to provide a molded pulp egg carton that will reduce egg rattle and egg breakage.

Another object of the present invention is the provision of an egg carton that combines characteristics of high strength with characteristics of positively holding the egg in parts that cushion the egg against shock.

Yet another object of the present invention is to provide an egg carton providing a soft and gentle support for long eggs at the bottom of the cell.

Other objects and many of the attendant advantages of the present invention will become apparent upon consideration of the following specification and accompanying drawings, wherein:

FIG. 1 shows schematically an apparatus in accordance with the invention and capable of performing the process of the invention.

FIG. 2 is a cross-sectional view, with parts in elevation, of a forming die used for forming an article in accordance with the present invention, with an article thereon.

Figure 4:
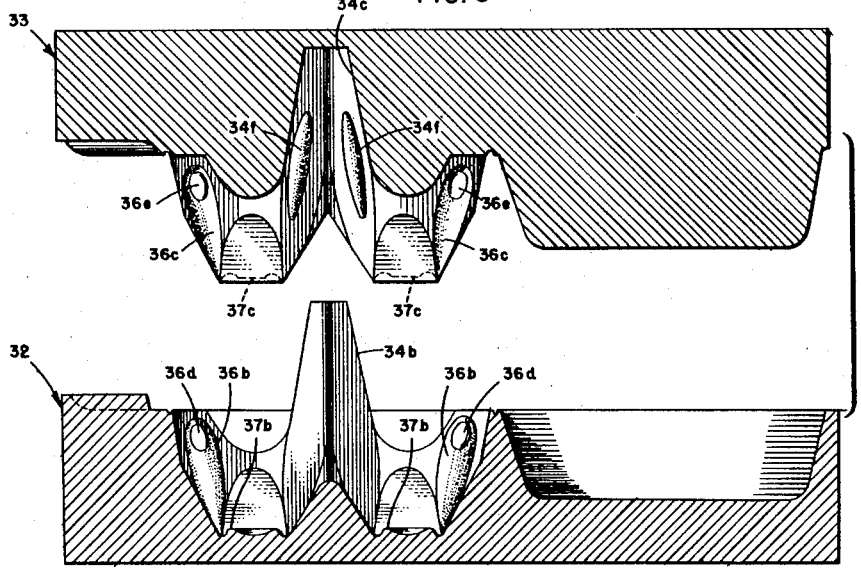
FIG. 4 is a view showing, in stepped sections, pressing dies in accordance with the invention.

FIG. 5 is a cross-section, taken generally on line 5—5 of FIG. 6, of the article after being reformed in the dies of FIG. 4 showing the article in a closed condition.

FIG. 6 is an unfolded, fragmentary plan view of the egg carton of FIG. 5.

FIG. 7 is a fragmentary elevational view of a single egg cell of the carton shown in FIG. 6.

FIG. 8 is a cross-sectional view taken on the line 8—8 of FIG. 7.

Figure 9:
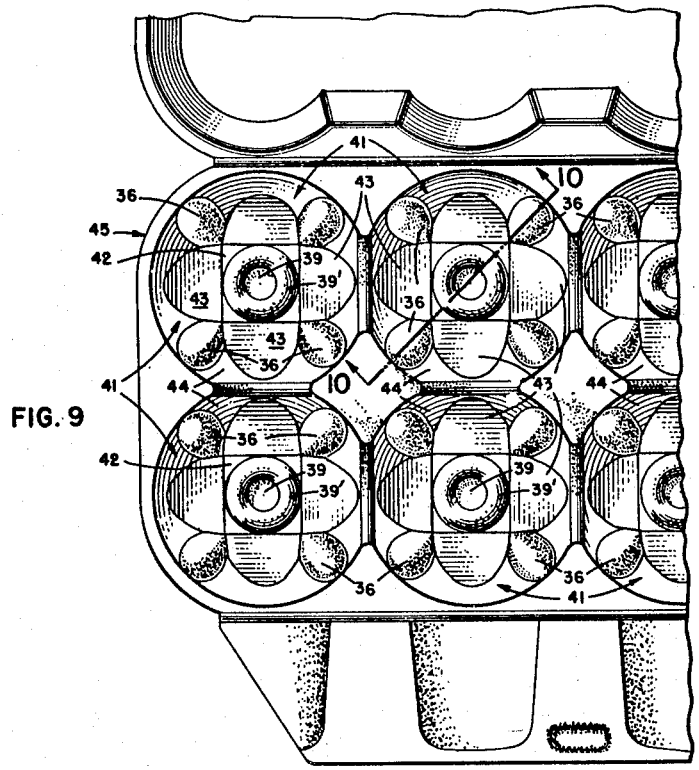

FIG. 9 is a fragmentary plan view similar to FIG. 6 of the bottom section of another form of egg carton in accordance with the present invention.

Figure 10:
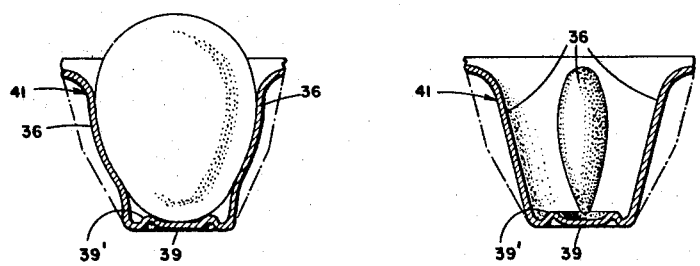

FIG. 10 is a cross-sectional view taken on the line 10—10 of FIG. 9.

Figure 11:
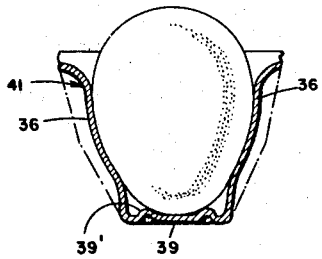

FIG. 11 as a view similar to FIG. 10 and showing an egg in the cell thereof.

FIG. 12 is a fragmentary plan view similar to FIG. 6 of the bottom section of another form of egg carton in accordance with the present invention.

FIG. 13 is an elevational view of an egg cell of the bottom section shown in FIG. 12.

FIG. 14 is a cross-sectional view taken on the line 14—14 of FIG. 13.

FIG. 15 is a cross-sectional view taken on the lines 15—15 of FIG. 12.

FIG. 16 is a view similar to FIG. 15 and showing an egg in the cell thereof.

FIG. 17 is a fragmentary plan view similar to FIG. 6 of the bottom section of another form of egg carton in accordance with the invention.

FIG. 18 is an elevational view of an egg cell of the bottom section shown in FIG. 17.

FIG. 19 is a fragmentary vertical section taken substantially on the line 19—19 of FIG. 17.

FIG. 20 is a cross-sectional view taken on the line 20—20 of FIG. 19.

FIG. 21 is a plan view of another cell in accordance with the present invention.

Figure 22:
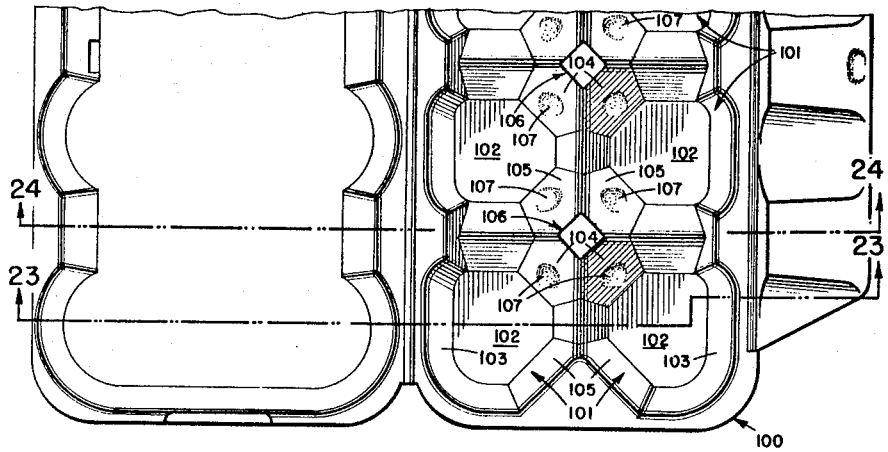

FIG. 22 is a fragmentary plan view similar to FIG. 6 of another egg carton made in accordance with the present invention and on a slightly reduced scale.

Figure 23:
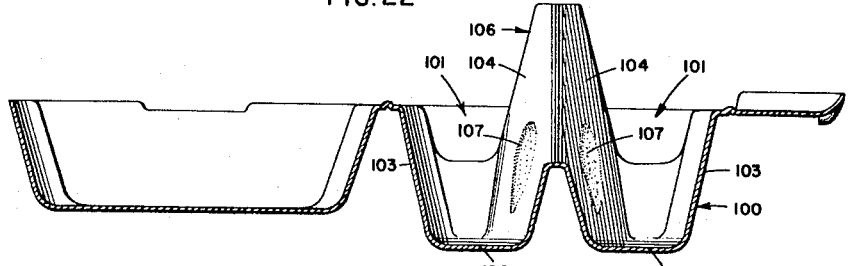

FIG. 23 is a cross-sectional view taken on the line 23—23 of FIG. 22.

Figure 24:
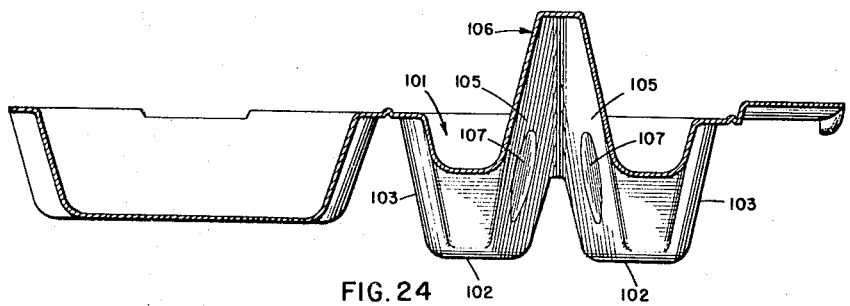

FIG. 24 is a cross-sectional view taken on the line 24—24 of FIG. 22.

FIG. 25 is a plan view of an egg flat of the present invention.

FIG. 26 is a cross-sectional view of the egg flat of FIG. 25, and showing a cover in place thereon.

Referring now to the drawings, wherein like reference characters are used to designate like or corresponding parts throughout the several views, there is shown in FIG. 1 a preferred apparatus for carrying out the process of the invention, and there may be seen therein the molding apparatus generally designated 20, this molding apparatus comprising in known manner a molding wheel 21 having on the periphery thereof a plurality of forming dies 22. A tank 23 containing a pulp slurry is positioned beneath the wheel 21 so that the forming dies 22 will be immersed in the slurry as the wheel 21 revolves. In known fashion, when the die 22 is immersed in the slurry, suction will be applied to the inner side thereof to suck the slurry through the mold 22 so that the pulp fibers lodge on the outer surface of the mold, which is usually a fine mesh screen.

The forming dies 22, see FIG. 2, include a perforated backing plate or base 22a which is tooled to have the ultimate preform shape and has formed therein a plurality of transverse suction passages 22b. The inner surface of the plate 22a is covered by a foraminous screen 22c.

It will be noted that the forming die 22 includes post-forming portions, to be later discussed in detail which have relatively few accessible suction passages 22b at the area 22d of the post. The paucity of suction passages at the areas 22d tends to result in a relatively thinner layer of fibers as compared with other portions, for example, the planar top of the carton, etc.

The posts are a closed, hollow elongated formation. It is known to those skilled in the art that ordinarily insufficient pulp will be deposited to properly form the posts, which must resist rupture when subjected to great vertical loading.

It will subsequently become apparent that the reforming step accomplishes, in addition to changing the support post shape, the compaction of the hollow post to eliminate voids on thinly deposited sections (thus reducing "rejects") and the volume of the egg cells is increased to facilitate the accommodation of larger sized eggs without disturbing exterior dimensions of the egg cartons.

When the article has been formed on the forming die 22, it leaves the slurry and at this stage contains a great amount of water. The wet article A is removed from the die 22 and transferred to a drying form 26 that is carried by a conveyor 27. Conveyor 27 extends through a drying apparatus, preferably a drying oven 28. After traversing the oven 28, the article A is placed between pressing and reforming dies.

The pressing and reforming dies may be mounted as shown in FIG. 1 in a press 30 which carries the mutually reciprocable mating dies 32 and 33. The article A is removed from the drying form 26, and at this stage, of course, it will be understood that the article A is formed and dried and that it usually has at this stage of its manufacture a small amount of warpage. It is transferred by known means to the press 30, and there is then effected a reciprocable movement of one or both of the dies 32 and 33 to cause them to come together to press and reform the article A between them.

Figure 3:
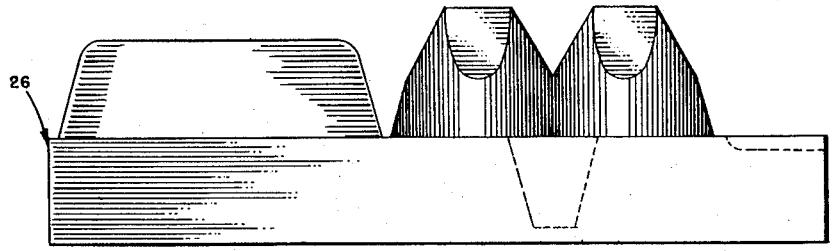
FIG. 3 is an elevation of a drying form.

The die 22, shown best in FIG. 2, molds or forms the article A as above stated; article A is, in the example shown, an egg carton having a bottom section with egg receiving cells that are generally concave with an upstanding button on the cell bottom, as is well known; article A uniquely has posts 34 of sufficient height to engage the underside of the top of the cover when the carton is closed. The drying form 26, shown in FIG. 3, is of the same configuration as the die 22, and is preferably a male form, as shown.

The pressing and forming dies 32 and 33, shown in FIG. 4, have portions thereon which reform several parts of the carton bottom section. The female die 32 has an upstanding post 34b that is similar to the post 34a of the die 22. Each post 34b has four sides, each of which conforms to the surface of an inclined cylinder, two such sides being shown in FIG. 4. However, the angle to the vertical of the sides of post 34a of die 22 is less than the angle to the vertical of the sides of post 34b of the female pressing die 32. In practice, this difference is in the order of 2½°. The height of post 34b is the same as the height of post 34a, but the extent or area of the top of post 34a is greater than that of post 34b.

The male die 33 has a generally corresponding recess 34c, made up of four inclined sides which conform to the surface of cylinders; the sides of recess 34c have, however, protruding generally elliptical blisters 34f which have their greatest outward extension at the approximate midpoint thereof and are each regularly curved therefrom. The blisters 34f are in registry with similarly shaped areas of the article or carton A of reduced thickness relative to the normal thickness of the article A.

The manner in which blisters 34f are formed on the carton preform is accomplished by means of blister-shaped blocking-out elements (not shown) incorporated on the screen 22d, and the pulp fiber in the blister-forming areas will build up over the blocking-out elements during initial suction deposition.

Figures 4A, 4B:
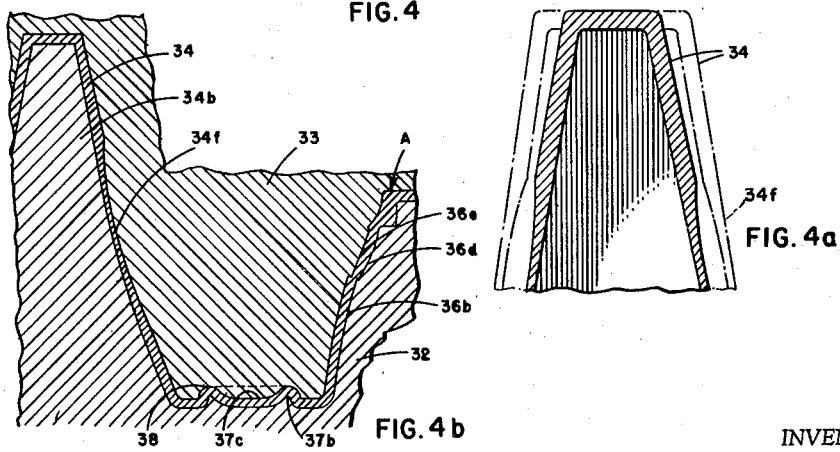
FIG. 4a illustrates the relative dimensions and shapes of a portion of an article before and after treatment in the pressing dies of FIG. 4.
FIG. 4b is a cross-sectional view showing the pressing dies of FIG. 4 pressing and reforming an article therebetween.

After reforming, it will be noted in FIGS. 4a and 4b, the thickness of those portions of the posts adjacent the blisters 34f will be greater than the thickness of the blisters and the indentation will be reversed, i.e., in FIG. 4a the blisters are partially formed on the inner surface of the posts 34 of the preform, and after reforming the blisters are on the outer surface.

The blisters 34f in the final product will comprise fiber in which the bond between individual fibers has been disturbed, and this results in a cushioning area which will accommodate eggs of different grades or sizes.

It will be noted that although the blister-forming portions are initially formed "thinner" the post portions between adjacent blisters 34f will be uniform in thickness along the length of the posts 34.

The posts will have sufficient columnar strength to transmit or sustain vertical loads or shocks and yet include selected areas with unique cushioning or supporting characteristics.

As a result of the differences in the configuration of the forming die and the pressing dies, during the pressing of the egg carton A, the walls and top of the post are reformed; the pulp of the top is crowded together towards the center, but the relative height of the top of the post is unchanged. This is shown in FIG. 4a, the dashed lines illustrating the size and shape of the post 34 of the article A after it is formed and dried, and the full lines illustrating the size and shape of the post 34 after it is reformed in the dies 32 and 33. The walls of the posts are reformed by having the angle thereof changed so as to be less steep, this also appearing in FIG. 4a.

As mentioned above, the carton produced by the novel method "uniquely has posts 34 of sufficient height to engage the underside of the top of the cover when the carton is closed." The posts per se comprise a hollow closed construction which must withstand vertical loading in the finished carton, and thus must contain sufficient fibers to afford a good base upon which the underside of the cover will rest. Known suction molding techniques, as mentioned above, do not provide sufficient fibers at the upper ends of the posts, i.e., in the preform.

The initially formed posts 34 of the preform A are of a size which is greater than the corresponding post of the ultimate carton. This expedient permits the side walls of the hollow post, which is closed at its top, to be bodily displaced approximately 2½ degrees and the pulp or fiber is crowded toward the center of the posts. By crowding the pulp toward the center, the posts of the finished carton gain columnar strength, the volume of the adjacent cells is increased without a change in the exterior dimensions of the carton, and the crowding of the pulp compensates for any thin portions at the crown or top of the posts. The reforming technique thus provides means for increasing a concentration of fiber at a critical area which cannot be accomplished by conventional suction molding techniques where especially long and relatively small dimensioned shapes are involved.

In conventional reforming or pressing techniques where opposed surfaces of a layer of fiber are pressed and grooves or embossments are formed, if closed hollow posts of a preform are pressed by dies from both the inside and outside by mating dies, the posts would be stretched, and any minor faults in the post would be exaggerated or be further developed, i.e., where an excessively thin layer of fiber has been deposited. By using an inward compaction and reforming technique as explained above, any thin sections formed during initial molding of the carton preform posts are compensated for during the reforming step, and production time can be decreased because if post portions are suction molded relatively thin, this discrepancy is compensated for during reforming and compaction.

The areas of carton A registering with the blisters 34f are also reformed, due to the relative shapes of the forming die 22 and the pressing dies 32 and 33, particularly pressing die 33.

While the egg cells of the article A, as molded on die 22, are generally concave with rounded and flat portions as shown in the patent to Cox No. 2,771,233, issued November 20, 1956, these cells are also reformed in the dies 32 and 33. In the female pressing and forming die 32 flute-like protrusions 36b are provided on the wall of the egg cell cavity thereof; these protrusions 36b are of a generally elongated tear drop shape, having downwardly tapering tails. A shallow dent 36d, of preferably circular configuration, is located in the protrusion 36b, adjacent the upper end or head thereof. A corresponding flute-like indentation 36c is provided on the mating pyramidal male part of the die 33, there being a bulge 36e at the upper end thereof. Pressing die 32 also has an annular protrusion 37b on the bottom of the cavity thereof, and the male die 33 has a protrusion 37c (see FIG. 4b) on the bottom of the mating pyramidal male part, protrusion 37c being surrounded by a groove 38.

In FIG. 4b there is shown a cross-sectional view, taken diagonally through an egg cell, and showing the article A being pressed and reformed in the pressing dies 32 and 33.

The blister 34f is seen pressing and reforming a side of a post 34, the post 34 being thinner than normal where it is in registry with blister 34f. This thinness is due in part to the fact that this area was formed thinner and in part to the fact that it is pressed between the blister 34f and the underlying part of the post 34b of die 32.

The annular protrusion 37b of pressing die 32 cooperates with the protrusion 37c and groove 38 of pressing die 33, and the protrusion 36b and dent 36d cooperate with the flute-like indentation 36c and bulge 36e, respectively.

The resulting article A as shown in FIG. 5 is, of course, the same article A that was formed on the die 22, but has been reformed in part to have flutes 36 that extend into the egg cells of the article A, the flutes 36 having flattened upper ends 36'. The molded pulp button that was an upstanding protrusion on the bottom of the egg cell of article A has been reformed into a thin wafer 39 having a surrounding pillow 39'. It will be understood that the position and dimension of wafer 39 with respect to the cell bottom, either higher, lower, thicker or thinner than that shown in FIG. 5, depends upon the existence and height of the protrusion 37b and 37c on the dies 32 and 33. Thus, the wafer 39 may appear other than as shown in FIG. 5. The posts 34 extend upwardly into engagement with the underside of planar top 35 of the integral cover section of carton A, and each side of a post 34 has a thinned, generally elliptical area 34'.

It will be seen that the above described apparatus and process are effective to produce an article that is first formed, then dried and finally pressed and reformed so as to obtain a different configuration of the article. Not only does there result a change in the configuration of the article, but more importantly there results a change in the characteristics of that part of the article that has been reformed. Thus it is to be understood that the reforming of the parts of the article that become the flute-like protrusion 36 and wafer 39 shown in FIG. 5 serves to disturb the entire body of fibers therein and the bond between the fibers. As to the flute-like protrusions 36, the carton body portion as initially formed was concave, and is reformed to a convex configuration that is considerably softer and more yielding than the remaining nonreformed part of the article or carton A. Thus, the article or carton A retains its general over-all strength but is provided with flute-like protrusions 36 that possess completely different charcteristics from the other (non-reformed) parts of the carton in that they will yield more readily under load. The reforming of an article is great enough in certain instances to cause the reformed part of the article to go to a point of opposite image; the originally formed article may, for example, have a part that is concave a certain amount, and that is convex a like amount after reforming.

The wafer 39 and pillow 39' are also soft and yielding, and serve to cushion any long eggs that come into contact with them, and this formation will prevent leakage in the event of breakage.

Although the apparatus shown is the preferred apparatus for carrying out the process, it will be understood that other apparatus may also be used and that, in general, any apparatus that first forms an article and then reforms it after it has dried, preferably, is suitable. For example, the process may be carried out by an apparatus in which the pulp is first molded into a sheet, and then the article is initially formed from the sheet; thereafter, the article may be reformed in accordance with the above teachings. Other apparatus that are suitable for carrying out the process of the invention will be apparent to those skilled in the art, only one of the apparatus having been shown in the drawings.

Referring now to FIG. 6, there may be seen therein a plan view of the carton shown in section in FIG. 5. The egg carton bottom section 40 is an egg receiving section having egg receiving cells 41, each of the cells 41 having a square bottom 42, from the sides of which the lower wall portions 43 incline upwardly and outwardly at a predetermined angle to the vertical, thereby providing a generally polygonal lower portion of the cell. The polygonal lower wall portions 43 merge upwardly with rounded, generally conical, upper cell portions 44, and these upper cell portions 44 are at a lesser angle to the vertical than the lower portions 43. The cell as thus described is known in the art, and is fully described in Patent No. 2,771,233, which issued to J. W. Cox on November 20, 1956. From each corner of the base 42 there extends upwardly, and at an angle that is preferably 15° but may be within the range of 10°-15°, the reformed convex flutes 36. Flutes 36 have flattened upper ends 36' to provide a cell having more room for the egg than would be the case otherwise. In the bottom 42 are the reformed wafers 39 and pillows 39'.

FIG. 7 shows the appearance of an egg cell 41 from the outside thereof, and there may be seen the reverse, or concave, side of the flutes 36, as well as the flattened upper ends 36' thereof, the flat lower wall portions 43 and the conical upper cell portions 44.

FIG. 8 shows the thin and yielding egg-contacting area 34' in the post 34, the posts 34 in the regions on either side of the area 34' being relatively thick and thus having a high strength. The posts 34 are therefore strong at the four regions where the sides of the post 34 join each other, and consequently have good columnar strength. There may also be seen in FIG. 8 the shape of the flutes 36 as well as the flattened end 36' of one flute 36.

The egg carton shown in FIG. 9 is generally similar to that shown in FIGS. 5 and 6, with the exception that there is not provided in this embodiment the posts 34 that contact the underside of the cover of the carton. Instead, the posts are of normal height, i.e., they extend only as high as the highest part of the remainder of the bottom section. Thus, the carton of FIG. 9 more closely resembles that carton which is disclosed in Cox Patent No. 2,771,233. The carton of FIG. 9, as will be apparent, is one which is reformed from a carton that is molded in accordance with the Cox patent, and therefore does not require the production of or changeover to new molding dies in a plant having such dies for the production of the carton of the Cox patent.

The carton of FIG. 9 has a bottom egg receiving section 45 with egg cells 41 that are the same as egg cells 41 of the bottom section shown in FIG. 6. Thus, there is shown in FIG. 9 the bottom 42 with wafer 39 and pillow 39', the lower wall portions 43 and the upper cell portions 44.

The flutes 36 are of teardrop shape at their upper ends to facilitate the reforming of the material, and have a relatively large radius. The radius is important from consideration of flexibility, flexing of the material and the convergence of the flutes at the cell junctures.

In FIG. 10 there may be seen the egg cell 41 having the two flutes 36 therein in full line position, the portions that formed the flutes 36 before the reforming of the carton bottom section 45 being shown in dotted lines.

Eggs placed in an egg cell 41 will lodge upon the flutes 36 therein, and as shown in FIG. 11, will deflect and depress the reformed flute 36 because of the softness and cushioning ability thereof. The cushioning ability of the reformed flute 36 is such that an egg may be safely dropped into the cell 41, as is done in automatic egg carton filling machinery, without danger of egg breakage. With the reformed flute, each cell acts independently, so that a heavier egg in one cell will cause the reformed flutes thereof to deflect without having any effect on the eggs in adjacent cells, or the adjacent cells themselves.

In the copending application of Henry A. Lord and Harold S. Crane, Serial No. 669,362, filed July 1, 1957, which matured into United States Letters Patent 2,924,-368 on February 9, 1960 there is described an egg carton having egg receiving cells that are generally triangular, or trapezoidal, and such a carton has been shown in FIG. 12, reformed in accordance with the present invention. Thus, there may be seen in FIG. 12 a lower section 50 of an egg carton, section 50 having a plurality of cells 51 each of which includes a horizontal base 52 that is substantially in the shape of an equilateral triangle, or regular trapezoid. Extending upwardly from each of the three edges of cell base 52 of each cell is a cell wall, there being therefore three walls 53, 54 and 55. Each of the walls 53, 54 and 55 tapers in width perimetrically of the cell in extending upwardly towards the top of the carton bottom section. Also, each of the cell walls or lowermost portions inclines upwardly and outwardly from the base 52, so that the several walls diverge from each other. Above the walls 53, 54 and 55 there are upper wall portions 53A, 54A and 55A that extend upwardly from the top of their respective lower walls and at a lesser angle to the vertical. Extending between the walls above described and as shown on the drawing, there are auxiliary walls 56, 57 and 58, and these auxiliary walls are of substantially the same angle of inclination as the upper wall portions 53A, 54A and 55A and extend upwardly from the apices of the triangular base 52, increasing in width from said apices.

Flutes 53B, 54B and 55B are reformed from the corresponding lower and upper walls 53, 53A, 54, 54A, and 55, 55A.

The appearance of typical flute 54B is shown in FIG. 13, and the protrusion of the flutes 53B, 54B and 55B into the cell 51 is clearly shown in FIG. 14. FIG. 15 shows in dotted lines the position of the walls 53, 53A and 54, 54A after the carton 50 is initially formed and shows in full lines the reformed flutes 53B and 54B, in accordance with the invention.

In FIG. 16 there may be seen cell 51 having the reformed flutes 53B and 54B, and it may be clearly seen that these reformed flutes have deflected in order to accommodate and receive in a cushioning manner the egg therein.

In FIG. 17 there is shown a lower section 60 of an egg carton having a plurality of cells 61 each of which includes a horizontal base 62 that is substantially in the shape of a trapezoid. Extending upwardly from each of the four edges of cell base 62 of each cell is a cell wall, the four walls being designated 63, 64, 65, 66. As in the carton 50 of FIGS. 12, 13 and 14, each of these walls extends upwardly towards the top of the carton bottom section, and as in carton 50 each of the cell walls inclines upwardly and outwardly from the base 62 and diverges from each other wall.

Reformed flutes 67, 68, 69 and 70 may be seen in the upper parts of the cells 61. In this embodiment, no flute is adjacent the hinge 71, as results with the placement shown in FIGS. 12, 13 and 14.

FIG. 18 illustrates the appearance of the cell 61, in exterior elevation, and showing the reformed flutes 68 and 69, which are those flutes that are closest to the outer margins of the carton bottom section 60. FIG. 19 shows the reformed flutes 67 and 70 that are closer to the interior of bottom section 60, these two views showing the relative spacing of these pairs of reformed flutes. As is best shown in FIG. 19, the flutes 67 and 70, which are in the walls of the posts of bottom section 60, extend from adjacent the tops of the posts and terminate well above the bottom 62. These flutes 67 and 70 are thus relatively short.

In FIG. 20, there may be seen the convex reformed flutes 67, 68, 69 and 70, and the straight walls 63, 64, 65 and 66 of the cell 61 therebetween.

FIG. 21 shows a cell 80 that is generally similar to the cell 61, but has only two flutes 87 and 90 therein, corresponding to the flutes 67 and 70 of the cell 61. This is a simpler cell which provides suitable cushioning support for the eggs.

In FIGS. 22 and 23 there is shown a carton bottom section 100 similar to the carton bottom section 60 of FIG. 17, in that the cells 101 of this carton are of the generally triangular shape of the cells 61. Thus, the cells 101 may be seen to comprise a generally triangular bottom 102 with the three main diverging and inclined walls 103, 104 and 105 rising therefrom. The walls 104 are parts of a reformed post 106 which has a height sufficient to contact and support the underside of the carton cover, the height of post 106 being clearly shown in FIG. 23.

The underside of walls 104 and 105 of the posts 106 are thin in the area indicated at 107. The thinned areas 107 are of generally tear drop shape and are positioned laterally intermediately of the walls 104 and 105. They extend from near the top of walls 104 and 105 to adjacent the level of the cell bottoms 102, and therefore are engaged by eggs placed in the cells. Because of the thinness of the areas 107, the walls 104 and 105 will deflect under the weight of an egg, and thus will yieldingly cushion the egg. These areas are similar to the thinned areas 34' of the carton A, shown in FIGS. 5 to 9.

The triangular cell 101 may be utilized in an egg flat for holding thirty-six eggs, as is shown in FIG. 25, wherein there may be seen the cells 101 each having a bottom 102 and the walls 103, 104 and 105, the latter forming the posts 106. There are three rows of posts 106, and in addition there are two rows of posts 108, one row of posts 108 lying between each two rows of the posts 106.

The walls 104 and 105 of the post 106 of the egg flat may also have the thinned areas 107, as is shown in FIG. 26, where there is also shown the posts 106 and 108. A cover 109 having a planar top 110 and depending side walls 111 may be positioned on the egg tray, to protect eggs therein. The posts 106 and 108 will engage with and support the underside of the top 110 of the cover 109.

The egg flat of FIGS. 25 and 26 may be divided into groups of cells with each group containing only a few cells. Thus, each group may contain one dozen eggs, or a half-dozen eggs. Where a dozen eggs is to be sold, the egg flat may be cut along a line of posts 108, and the cover 109 cut correspondingly.

There has been provided apparatus and process for making a greatly improved molded pulp article, particularly a molded pulp egg carton. In accordance with the apparatus and process of the invention, an article is first or initially formed and then a part of the article is reformed and this part obtains thereby a softness and resiliency that it did not initially possess and which is not possessed by articles or cartons that are initially formed in the same configuration as the reformed article or carton hereof. There has also been provided superior egg cartons that have reformed flutes extending or protruding into the cell space to receive an egg in a secure manner and yet which cushion the egg to reduce egg rattle and egg breakage. Further, by the process of the present invention, it is possible for the first time to manufacture molded pulp egg cartons in which a past extends upwardly from a bottom section to engage a planar top of a cover section.

It will be obvious to those skilled in the art that various changes may be made without departing from the spirit of the invention and therefore the invention is not limited to what is shown in the drawings and described in the specification but only as indicated in the appended claims.

What is claimed is:

1. The method of producing a molded pulp egg carton having a cellular bottom tray including a peripheral margin integral and hingedly connected along one edge to a dished cover having a planar top panel and depending sides engageable on the peripheral margin of said cellular bottom tray, and wherein a plurality of cells are formed about vertically extending hollow post integral with said cellular bottom tray and projecting vertically above the peripheral margin thereof, said method comprising the following steps:
    (a) sucking a pulp fiber preform formation for a pulp slurry onto a foraminous die of the general shape and contour of said egg carton including said hollow-post forming portions;
    (b) removing said pulp fiber preform formation from said foraminous die;
    (c) drying said pulp fiber preform formation after having removed it from said foraminous die; and
    (d) pressing said pulp fiber preform formation between mated pressing dies which include male and female hollow-post accommodating portions smaller in horizontal cross section near the top thereof than the corresponding horizontal cross section of said foraminous die, and compacting and reforming the pulp fiber at the top of said hollow-post portion on said preform and reducing the outer and inner margins of a transverse section near the top of said hollow-post forming portion.

2. The method as claimed in claim 1 including:
    (e) forming the hollow-post forming portion of said pulp fiber preform at a relatively steep angle with respect to a horizontal plane passing through the bottom of said cellular bottom tray and with a transverse cross section facilitating removal of the pulp fiber preform from said foraminous die;
    (f) reforming said hollow-post portion while pressing it inwardly from all sides to an angle differing from that initially formed on said foraminous die to increase the capacity of the egg cells of the carton and facilitating nesting and denesting thereof.

3. The method as claimed in claim 1 including:
    (e) forming on said hollow like post forming portions intermediate discrete areas having a fiber consistency differing from that of adjacent portions surrounding said discrete areas, while sucking said pulp fiber preform onto said foraminous die; and
    (f) reforming and pressing said discrete areas to a thickness thinner than said surrounding areas while reforming said hollow post forming portions with a smaller horizontal cross sectional area.

4. The method as claimed in claim 3 including:
    (g) maintaining said hollow post-forming portion at a length substantially equal to that at which it was initially formed on said foraminous die while reforming and compacting said post-forming portion inwardly and while reforming and pressing said discrete areas.

5. The method of forming a molded pulp egg carton of the character having a cellular tray integrally connected to a dished cover and wherein a plurality of cells are grouped about a hollow post, said method comprising the following steps:
    (a) sucking a pulp fiber preform formation from a pulp slurry onto a foraminous die of the general shape and contour of said egg carton and including a hollow-post forming portion;
    (b) removing said pulp fiber formation from said foraminous die and effecting drying thereof;
    (c) pressing said pulp fiber formation between mated pressing dies including a hollow-post forming portion smaller in horizontal sectional area near the top thereof than the corresponding area of said hollow-post forming portion of said foraminous die and the pulp fiber formation formed thereon and compacting and reforming the pulp fiber at the top of said hollow-post and reducing the outer and inner margins of its transverse section near the top thereof;

(d) forming on said hollow-post forming portions discrete areas having a thickness differing from that of adjacent portions, while sucking said pulp fiber preform;

(e) reforming and pressing said discrete area while reforming said hollow-post forming portion with a smaller horizontal sectional area;

(f) maintaining said hollow post length at substantially the length which it was initially formed on said foraminous die while reforming and compacting said post inwardly and while reforming and pressing said discrete areas;

(g) initially forming said discrete areas as thinned out sections on said foraminous die with the outer surface of the discrete areas substantially coplanar with adjacent portions of said hollow post forming portion; and (h) inwardly pressing said discrete areas to dispose the outer surface thereof below the outer surface of said adjacent portions while reforming said hollow post-forming portion.

References Cited in the file of this patent
UNITED STATES PATENTS

| | | |
|---|---|---|
| 2,160,893 | Newsom | June 6, 1939 |
| 2,924,368 | Lord | Feb. 9, 1960 |